US005183616A

United States Patent [19]

Hedrick

[11] Patent Number: 5,183,616

[45] Date of Patent: Feb. 2, 1993

[54] METHOD FOR MAKING ANTIQUED CONCRETE CORED BRICKS AND CAPPING BRICKS

[75] Inventor: Thomas W. Hedrick, Sikeston, Mo.

[73] Assignee: Hedrick Concrete Products Corp., Sikeston, Mo.

[21] Appl. No.: 433,044

[22] Filed: Nov. 7, 1989

[51] Int. Cl.[5] .......................... B28B 1/08; B28B 3/02; B28B 7/24; B29C 43/02

[52] U.S. Cl. ....................................... 264/219; 249/64; 249/123; 249/176; 264/71; 264/297.9; 264/333; 264/336

[58] Field of Search .................. 264/297.9, 297.8, 333, 264/336, 69, 71, 219; 249/123, 64, 52, 176

[56] References Cited

U.S. PATENT DOCUMENTS

| | | | |
|---|---|---|---|
| 839,812 | 1/1907 | Cooley | 249/123 |
| 853,608 | 5/1907 | Talbot | 249/123 |
| 855,822 | 6/1907 | Talbot | 249/123 |
| 898,911 | 9/1908 | Neeley | 249/123 |
| 1,101,093 | 6/1914 | Reagan | 264/296 |
| 1,337,618 | 4/1920 | Pipe | 249/64 X |
| 1,448,236 | 3/1923 | Riney | 249/176 |
| 1,512,974 | 10/1924 | Besser et al. | 249/64 |
| 1,517,452 | 12/1924 | Oehler et al. | 264/296 |
| 1,584,595 | 5/1926 | Bader | 249/123 |
| 1,601,793 | 10/1926 | Cullen | 249/64 |
| 1,905,170 | 4/1933 | Hervey | 264/296 |
| 1,905,897 | 4/1933 | Cahill | 249/64 |
| 1,985,115 | 12/1934 | Straub | 264/296 |
| 2,002,249 | 10/1961 | Jackson | 264/296 |
| 2,170,936 | 8/1939 | Baron | 264/82 |
| 2,276,558 | 3/1942 | Zuber | 249/176 X |
| 2,663,063 | 12/1953 | Van Loon | 249/64 |
| 3,802,659 | 4/1974 | Lebherz | 249/52 |
| 4,078,038 | 3/1978 | Gresham, Jr. | 264/296 X |
| 4,909,717 | 3/1990 | Pardo | 249/64 X |

*Primary Examiner*—Karen Aftergut

*Attorney, Agent, or Firm*—Kolisch, Hartwell, Dickinson, McCormack & Heuser

[57] ABSTRACT

A method for making concrete cored bricks and capping bricks includes providing a mold having a row of mold cavities separated by cross members having core-bar holes formed therein, inserting a core bar through each cavity and into and filling a core-bar hole associated with rear cavity. Next, a rear core-bar hole is plugged and the cavities are filled with a concrete to form plural uncured bricks. The bricks are then compacted and an elongate, interconnecting pattern is pressed into a first surface of each brick. Next, the core bar is removed from the cavities and the bricks are ejected from the mold. Finally, plural wet layers of colored coatings are applied to the first surface of each brick after which the bricks are cured. Antiqued concrete capping brick including a top surface, four side surfaces, and a bottom surface having formed therein at least one recess are also formed. Additionally, a first side surface of the brick includes elongate, interconnected indentations that extend to the edges thereof. Also, adjacent the edges of the first side surface, there are edge-indentations in the brick to provide a rolled edge effect. Finally, plural layers of colored polymeric coatings are disposed on the first side surface and a top surface of the brick.

4 Claims, 5 Drawing Sheets

FIG. 6
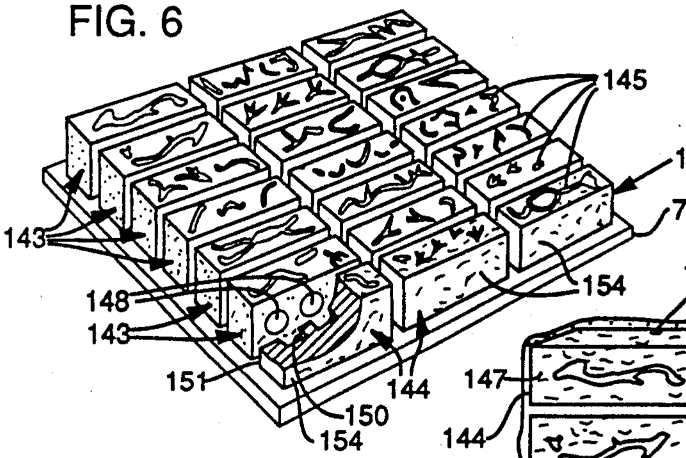
FIG. 11
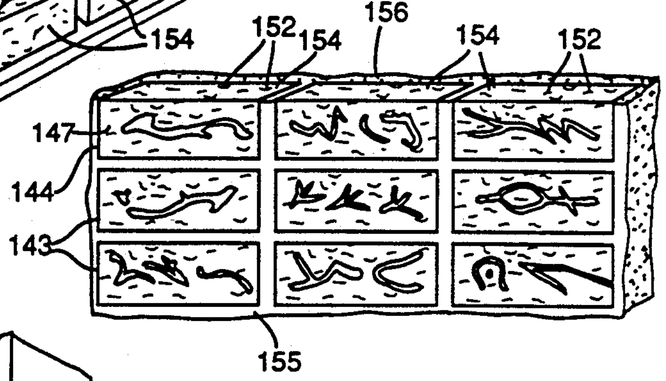
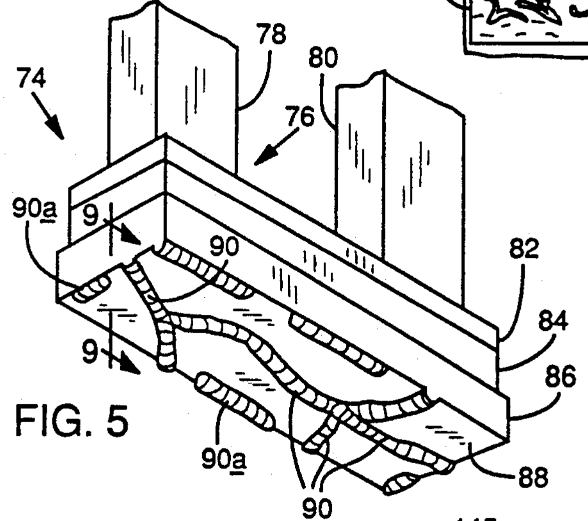
FIG. 5
FIG. 9
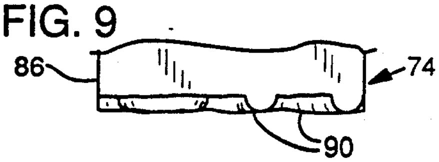
FIG. 10
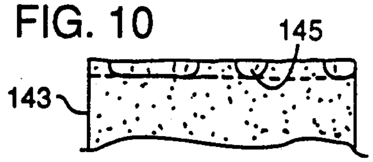
FIG. 7
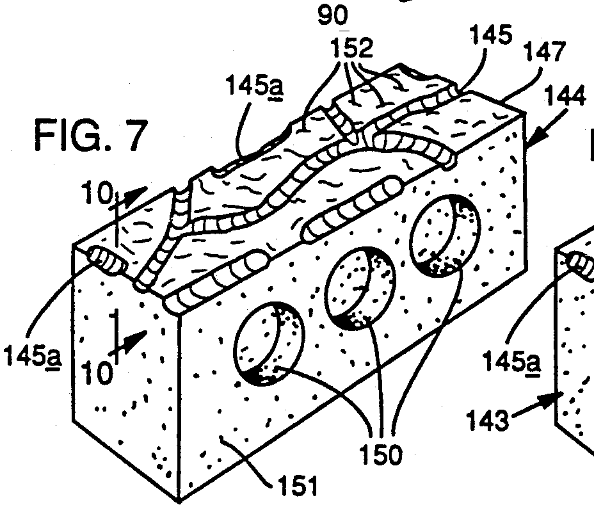
FIG. 8
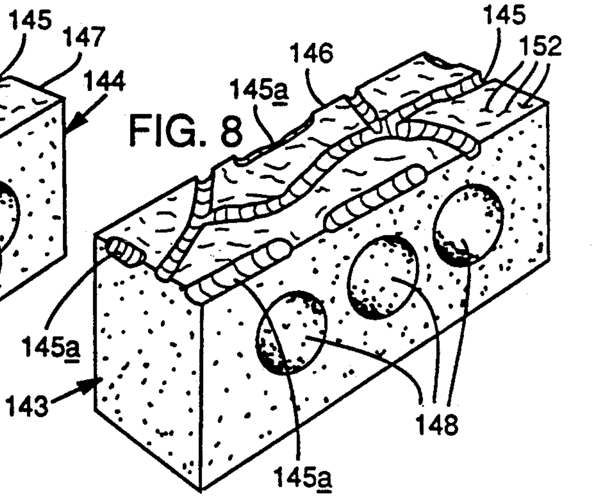

METHOD FOR MAKING ANTIQUED CONCRETE CORED BRICKS AND CAPPING BRICKS

BACKGROUND OF THE INVENTION

The present invention relates to apparatus for manufacturing concrete cored bricks, and more particularly to a novel method and apparatus for making antiqued concrete cored bricks and capping bricks.

It is known to produce concrete cored bricks by using a concrete brick making machine. Commonly, these machines include a mold box defining a plurality of mold cavities, supported above a pallet table which is mounted in a frame structure. To make cored bricks, a device is used to insert core bars into aligned core-bar holes in the mold box. By inserting core bars through the entire mold, the mold box is made ready for receiving concrete from a suitable concrete feeding device, resulting in the formation of plural uncured bricks.

Next, while the bricks are in the mold and the core bars are in place, the bricks are compacted and vibrated to compress the bricks so that they will hold their shape before being cured. Then, the core bars are removed from the mold and the bricks are ejected. Finally, the bricks are moved to a suitable curing station for curing.

Cored concrete bricks are desirable for three reasons. First, they are similar in appearance to clay bricks. This is desirable because the appearance of clay bricks is seen as the industry standard by certain purchasers. Thus, if concrete bricks are made to look like clay bricks there is a greater chance that they will be accepted by the industry. As is known to those of average skill in the art, both concrete bricks and clay bricks are equally effective as blocks for building walls, etc.

Second, with cored bricks, there is a savings in material without giving up any structural integrity. Third, the cores provide void areas for mortar to rise into when the brick is laid on a mortar bed. Such a feature gives bricks what is known to brick layers as "tooth".

In addition to cored concrete bricks, concrete capping bricks are also used by brick layers. Capping bricks are those that are used to "cap-off" a column of bricks. For example, if the bricks are being used to form the walls of a structure, capping bricks are used to cap the columns of bricks associated with window sills.

Capping bricks are solid because the top surfaces of such bricks are exposed and are used as a platform to support objects. Cored bricks are aesthetically inappropriate and structurally inadequate for such purposes.

Currently, if one desired to make solid concrete bricks, it would be necessary to change molds, i.e. to one without core-bar holes. This is the case because cored brick molds are inadequate for making solid bricks. The inadequacy is due to the presence of core-bar holes which, without core bars received therein, provide an area for concrete to escape during compressing and vibrating.

At best, such a process produces solid bricks that have irregular surfaces due to separation of the concrete in the core-bar holes from the concrete in the mold cavities when the bricks are ejected from the mold. In a worst case scenario, the structural integrity of the bricks are damaged during the ejection of the bricks.

With the requirement of changing molds, valuable manufacturing time is wasted and productivity is reduced. Such wasted time and reduced productivity is a particular problem for custom concrete brick manufacturers because they make special "runs" of customized bricks. A given order may require a certain amount of cored concrete bricks and capping bricks.

Additionally, it is desirable for custom brick manufacturers to include a distinctive pattern or coating on the brick surface(s) that are exposed for viewing when the bricks are installed.

Additionally, there is a need for capping bricks that have "tooth". Thus far, known capping bricks do not provide "tooth" because they are solid.

It is therefore an object of the present invention to provide a method for manufacturing a combination of cored bricks and capping bricks in a single manufacturing step.

A further object of the present invention is to provide a distinctive pattern/coating for customized concrete cored bricks and capping bricks.

Yet a further object of the present invention is to provide concrete bricks that have an appearance similar to clay bricks.

A still further object of the present invention is to provide a novel antiqued concrete capping brick that provides "tooth" for brick layers who are using the bricks to cap a column of bricks.

These and additional objects and advantages of the present invention will be more readily understood after considering the drawings and the detailed description of the preferred embodiment.

SUMMARY OF THE INVENTION

The present invention achieves the above-identified objects by comprising a method for making antiqued concrete cored bricks and capping bricks. The method of the present invention includes, in a mold having a row of mold cavities separated by cross members having core-bar holes formed therein, inserting a core bar through each cavity and into and filling a core-bar hole associated with a rear cavity. Next, a rear core-bar hole is plugged and the cavities are filled with concrete to form plural uncured cored bricks and capping bricks.

The bricks are then compacted and an elongate, interconnecting pattern is pressed into a first surface of each brick. The pattern may extend to the edges of the first surface. Also, elongate indentations are pressed into the brick adjacent the edges of the first surface to give the brick a "rolled edge" appearance like that of clay bricks.

Next, the core bar is removed from the cavities and the bricks are ejected from the mold. Finally, plural wet layers of colored coatings are applied to the first surface of each brick after which the bricks are cured.

Another aspect of the present invention involves the construction of an antiqued concrete capping brick including a top surface, four side surfaces, and a bottom surface having formed therein at least one recess for accumulating mortar and giving the brick "tooth" when the bottom surface is contacted with a layer, or bed, of mortar. Additionally, a first side surface of the brick includes elongate, interconnected indentations. The indentations may extend to the edges of the first side surface.

Also, elongate indentations are pressed into the brick adjacent the edges of the first side surface. Such edge indentations give the brick a "rolled edge" like that of clay bricks. Finally, plural layers of colored polymeric coatings are disposed on the first side surface and a top surface of the brick.

These and additional objects and advantages of the present invention will be more readily understood after a consideration of the drawings and the detailed description of the preferred embodiment.

BRIEF DESCRIPTION OF THE DRAWINGS

FIG. 5 is a perspective view taken along lines 5—5 of FIG. 2, after rotating approximately thirty degrees and tilting upward, and illustrates in detail the construction of a mold shoe used in accordance with the apparatus and method of the present invention.

FIG. 6 is a perspective view of a pallet of uncured bricks after they have been formed using the apparatus of the present invention;

FIG. 7 is a perspective view of an antiqued capping brick of the present invention;

FIG. 8 is a perspective view of an antiqued concrete cored brick made with the apparatus of the present invention;

FIG. 9 is a fragmentary sectional view taken along sections lines 9—9 of FIG. 5, and illustrates the elongate, interconnecting protrusions formed on the surface of the mold shoes;

FIG. 10 is a sectional view taken along lines 10—10 of FIG. 7, and illustrates in detail the construction of the elongate, interconnecting indentations formed in a surface of the capping brick of the present invention; and FIG. 11 is a fragmentary view of cored and capping bricks made with the apparatus of the present invention after the same have been stacked in a fixed position to form a structure.

DETAILED DESCRIPTION OF THE INVENTION

Figure 1:
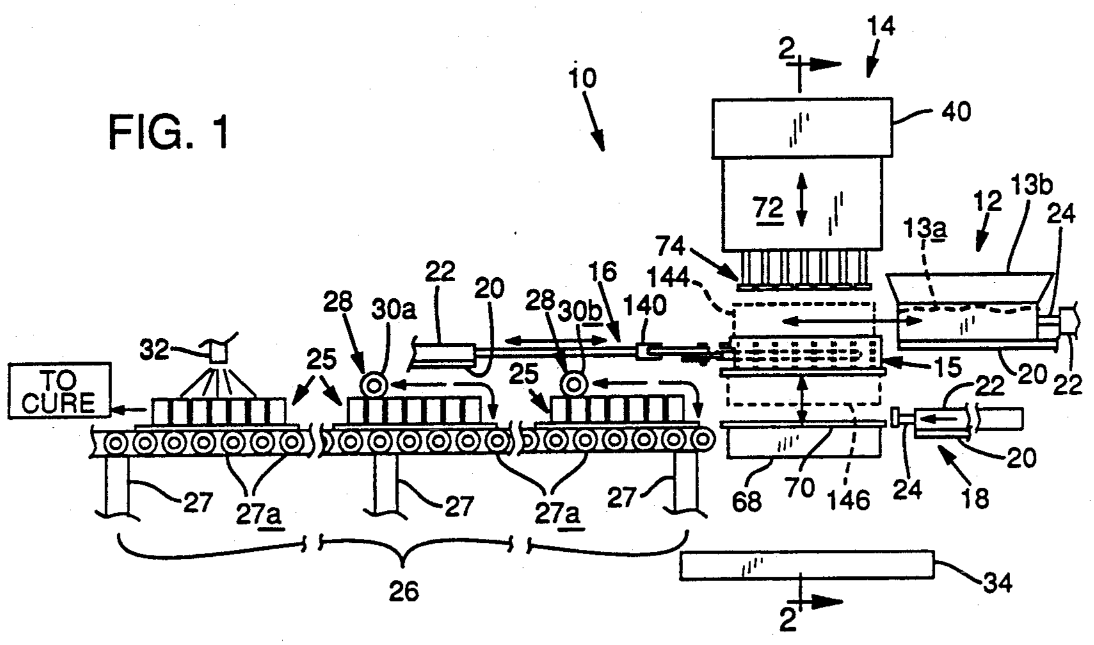
FIG. 1 is a schematic view of the apparatus and method of the present invention.

Turning now to FIG. 1, apparatus for making uncured antiqued concrete cored bricks and capping bricks according to the present invention is shown generally at 10. At the outset, the reader should be aware that the present invention will be described without illustrations of specific control devices, hoses, wiring, etc. Such features are considered to be well known to those having ordinary skill in the art.

Viewing the apparatus in a macro-sense, it includes a concrete feeding section 12 having a selectively openable concrete feeder 13 containing a load 13*a* of concrete. A hopper 13*b* is disposed over feeder 13 for directing concrete therein. Concrete may be loaded into the feeder using a suitable shovel means that is controlled manually, or by a suitable electromechanical device (undepicted).

Feeder 13 is movable horizontally into an upright brick forming section 14 to a position over a brick molding means, or mold box 15. The positioning of feeder 13 over mold box 15 will be further detailed in the description of FIGS. 3*a*, 3*b*.

Also movable horizontally into section 14, is a core puller section 16. Additionally, a brick transferring section 18 is included for moving pallets of uncured bricks (yet to be described) into and out of section 14.

A suitable frame structure 20 is used to support sections 12, 16, 18 adjacent section 14. Additionally, fluid-actuated cylinders 22 and associated rods 24 are included in each of sections 12, 16, 18 and are selectively operable to extend sections 12, 16, 18 into and out of section 14.

Referring to the left side of FIG. 1, a brick antiquing section 26 is supported on a suitable, upright frame structure 27, which includes a plurality of freely rotatable roller bars 27*a* mounted transversely therein for moving pallets of uncured cored bricks and capping bricks. Three of such pallets of bricks are shown generally at 25, but will be further described in connection with the description of FIGS. 2-6.

Still referring to section 26 in FIG. 1, paint rollers 28 are used to manually apply different colored polymeric coatings 30*a*, 30*b*. It would also be possible to automate the coating operation by using a electromechanically controlled spraying device.

Preferably, polymeric coatings 30*a*, 30*b* are comprised of a polymeric slurry including the following components listed in percentage by weight:

1. 12.7% Bonding agent, such as ethylene vinyl acetate;
2. 47.8% Portland Cement;
3. 1.6% Waterproofing agent, such as calcium stearate;
4. 4.8% Iron oxide coloring agent; and
5. 33.1% Water.

Concerning item no. 1 above, commercial suppliers include Rohm Haas Company and Air Products Company. Concerning item no. 4, commercial suppliers include Pfizer Chemical Company and Mobay Company.

Referring again to FIG. 1, a nozzle 32 is provided downstream of the coating application station of section 26 to provide a mist, or spray, of fluid that is directed at a yet to be described coated surface(s) of the bricks. Nozzle 32 is connected to a supply (undepicted) of a desired misting fluid. Preferably, water is used as the misting fluid.

Still referring to FIG. 1, pallets 25 of antiqued uncured bricks are removed from antiquing section 26 and placed in a curing station. Preferably, the antiqued bricks are moved using a forklift (undepicted). A curing station normally takes the form of a room that can be selectively heated to a minimum brick curing temperature of 80 degrees Fahrenheit.

Figure 2:
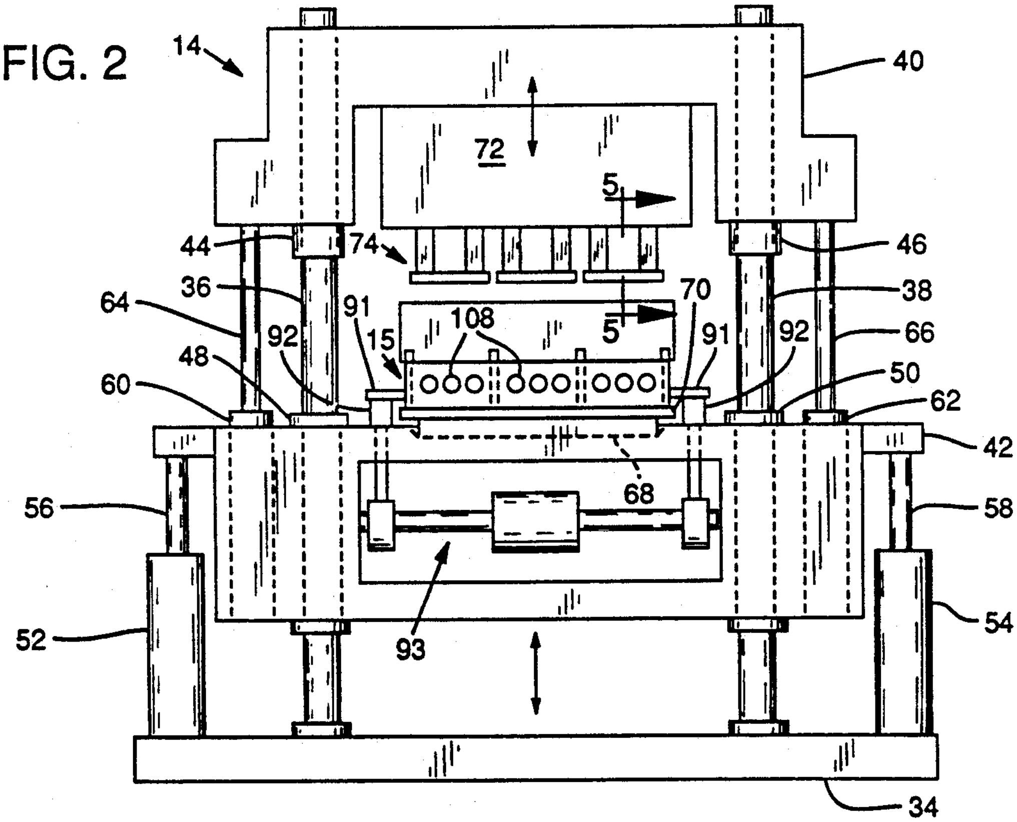
FIG. 2 is a front plan view taken along lines 2—2 of FIG. 1, further illustrating the positioning of the molding means relative to the concrete brick making device.

Referring now to FIG. 2, the construction of brick forming section 14 will be further described to make clear to those skilled in the art how to perform the method of the present invention. First of all, the reader should note that FIG. 2 does not show detailed structure of section 14. This is so because the structure of section 14 is known by those skilled in the art. Specifically, a brick forming machine that is preferable for the apparatus and method of the present invention is a Model 16 or Model 1600 brick machine manufactured by Columbia Machine, Inc. of Vancouver, Wash.

Referring to FIG. 2, section 14 includes a base section 34 which supports interconnected upright members and cross-beams, etc. Mounted on base 34 are a pair of opposed, upstanding guide columns 36, 38 which slidably receive a transversely-extending compression beam 40 and a main, or stripper, beam 42 disposed therebeneath. Compression beam 40 is provided with upper bushings 44, 46 and stripper beam 42 is provided with bushings 48, 50. Mounted on opposite ends of stripper beam 42 are fluid-actuated cylinders and associated rods operable for vertically shifting stripper beam 42. Specifically, cylinders 52, 54 are vertically mounted on base 34, and are selectively operable to extend rods 56, 58, respectively, which in turn are coupled to opposing ends of stripper beam 42.

Similarly, compression beam 40 is shiftable vertically by fluid-actuated cylinders and associated rods. Specifically, fluid-actuated cylinders 60, 62, disposed in cylindrically shaped voids formed in stripper beam 42, are selectively operable to extend rods 64, 66, which in turn are coupled to opposite ends of compression beam 40.

Additionally, stripper beam 42 supports a pallet table 68 on top of which is mounted a pallet such as that indicated at 70.

Still referring to FIG. 2, compression beam 40 includes a head spacer 72, to which is attached a plurality of downwardly extending mold shoe units 74. Referring to FIG. 5, each mold shoe unit 74 includes a mold head extender 76. Extender 76 includes two extender bars 78, 80 that are coupled to an extender plate 82. Extender 76 may be cast out of a suitable material such as metal, or the extender may be formed by suitable fastening bars 78, 80 to plate 82. Additionally, bars 78, 80 are preferably hollow for reasons soon to be described.

Disposed below plate 82, is a heater plate 84 which is coupled to extender plate 82. Heater plate 84 is made of aluminum and includes an electric resist heater (undepicted) disposed therein. As is known by those skilled in the art, a heating element (undepicted) is housed within head spacer 72 (FIG. 2), and is connected by electric leads (undepicted) from the head spacer, through one or both of the hollow cores in bar 78, 80, and through holes (undepicted) formed in extender plate 82, to heater plate 84. The heater plate is thus activable to heat a mold shoe 86 which is coupled to a downward surface thereof.

Still referring to FIG. 5, the heater plate is operable to heat mold shoe 86 to a temperature of 350°–400° F. Heating the mold shoes facilitates separation of the shoes from a yet to be described first surface of an uncured brick.

Formed on a compacting surface 88 of mold shoe 86 are elongate, interconnecting, snake-like protrusions 90 which are usable, in a way yet to be described, to form elongate, interconnecting, snake-like protrusions in a first surface of an uncured concrete brick.

Also formed on surface 88, are edge-protrusions **90*a* which are positioned along portions of the edges of surface 88. Both protrusions 90,90*a* may be formed by welding a bead of heated welding rod to surface 88**.

Referring back to FIG. 2, section 14 also includes two die supports 91 which are each coupled at one of their end surfaces to molding means 15. Another surface of each support 91 is coupled to spring loaded shafts 92 which are attached to a vibrator, shown generally at 93. The exact structure of the vibrator is not described as it is known by those skilled in the art.

What is important for purposes of describing the present invention, is that the reader understands that vibrator 93 is mounted to a portion of brick section 14 that does not shift vertically. This is important because vibrator 93 supports molding means 15 via die supports 91. Thus, molding means 15 is supported at the position shown in FIGS. 1 and 2, and will not shift vertically. The significance of the nonshiftable support of molding means 15 will become apparent in connection with the upcoming description of how bricks are formed in, and ejected from, the mold means.

Referring to FIGS. 1, 2, **3*a*, and 3*b*, the construction of molding means 15 and core puller section 16 will be described in detail. First, referring to FIGS. 3*a* and 3*b*, molding means 15 is shown as it is used in connection with core puller section 16. Molding means, or mold box, 15 defines plural rows of mold cavities 94, including back mold cavities 94*a***. Presently, a mold box defining three rows of seven cavities is used. Preferably, the mold box is made of hardened steel.

Specifically, mold cavities 94, **94*a* are defined by interconnecting mold members including mold panels 96*a*, 96*b*, 96*c*, 96*d* disposed in a parallel relationship. Eight cross members 98*a*, 98*b*, 98*c* are positioned transversely of panels 96*a*, 96*b*, 96*c*, 96*d* in a spaced apart relationship to form three rows of seven mold cavities each. Preferably, the interconnecting panels and cross members are positioned so that cavities 94, 94*a*** have the following approximate dimensions: 8" long × 3$\frac{5}{8}$" wide × 2" high.

Cross members **98*a*, 98*b* form two sides of mold box 15. Six inside cross members 98*b* are positioned through elongate slots formed in mold members 96*b*, 96*c***.

Figure 3A:
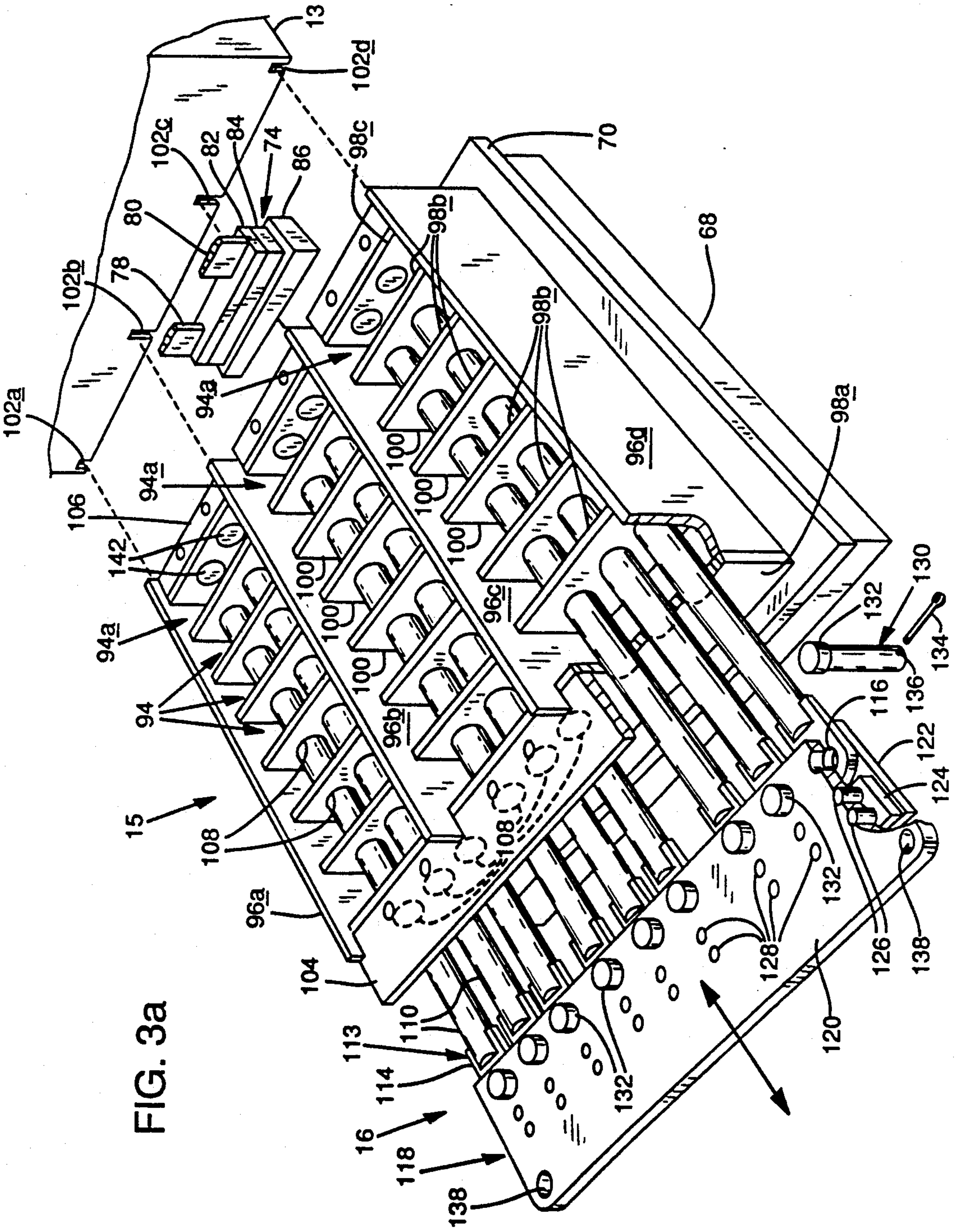
FIG. 3*a* is a fragmentary perspective view of a portion of the apparatus shown in FIG. 1, illustrating the construction of the molding means and core puller of the present invention with portions of the core puller and molding means broken away to show detail.
Figure 3B:
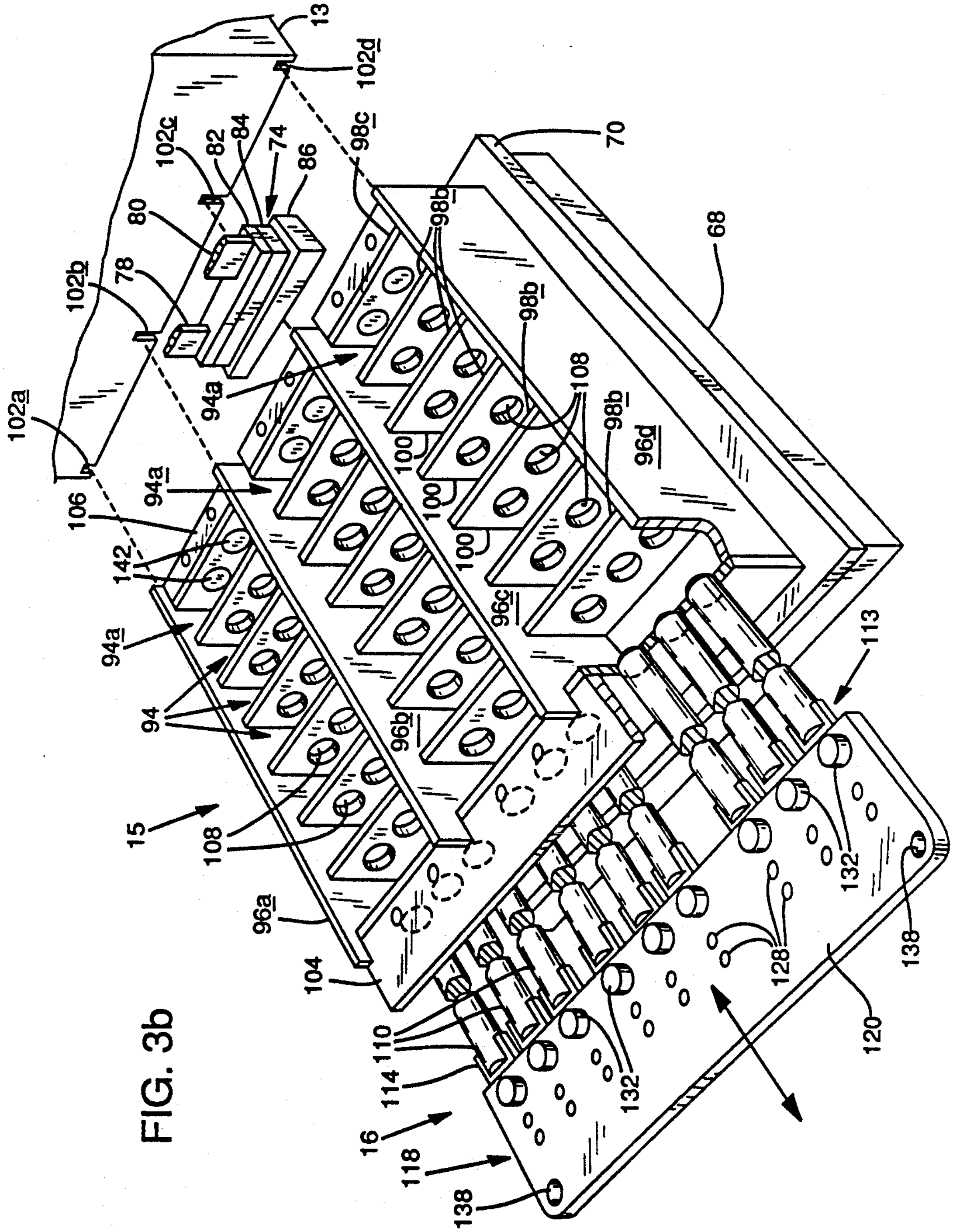
FIG. 3*b* is like FIG. 3*a* except that the core puller is shown in a second position with the core bars removed from the mold cavities of the molding means.

Additionally, and still referring to FIGS. **3*a* and 3*b*, cross members 98 are constructed to have a smaller height than mold members 96*a*–96*d*. The reason for this is that portions of mold members 96*a*–96*d* extending upward of cross members 98 define "tabs" which receive slots formed in concrete feeder 13. As shown in FIGS. 3*a* and 3*b*, mold members 96*b* and 96*c* are constructed slightly higher than mold member 96*a* and 96*b*, and slots 102*b*, 102*c* are correspondingly longer than slots 102*a* and 102*d***. The reason for this is that additional stability is added to the positioning of the concrete feeder over the mold box.

Also, formed on mold box 15 are plates 104, 106 which extend outwardly from cross members **98*a*, 98*c*, respectively, and normal to a plane containing the cross members. The reason for this is to provide additional support for the concrete feeder when it is moved over the top of mold box 15** with its slots engaging the upwardly extending "tabs" of the mold box.

Referring to FIGS. **3*a*–3*b*, cross members 98 are formed with three sets of three aligned core-bar holes 108** formed therein. Core-bar holes are made with a diameter of $\frac{7}{8}$"–1$\frac{1}{8}$". Concerning the sets of core-bar holes, single core-bar holes could be used in each set instead of three holes. However, it is preferable to use three holes because having three cores or recesses (yet to be described) formed in bricks has been found to give bricks the desired "tooth".

Referring again to FIGS. **3*a*–3*b*, core puller section 16 includes a plurality of cylindrically shaped core bars 110, having outside diameters suitable for inserting through core-bar holes 108. Further, core bars 110 have inserting ends 112 (refer to FIGS. 3*b* and 4) and supporting ends 113. Supporting ends 113 include connectors 114, each having formed therein a hole, such as that shown at 116. Connectors 114 are removably attached to a puller body 118**.

Specifically, puller body 118 includes a top plate 120 and a bottom plate 122 which are positioned in a spaced-apart relationship by positioning spacer bars, such as that shown at 124 therebetween. Spacer bars 124 are coupled to bottom plate 122, and include pairs of upwardly extending posts 126 which are received in correspondingly aligned pairs of holes 128 formed in top plate 120.

With connectors 114 received in the space between top plate 120 and bottom plate 122, bolts 130 are placed through aligned holes in top plate 120 and bottom plate 122 and through holes 116. The bolts do not slide through holes 116 because bolt head 132 is constructed with a dimension that is larger than holes 116. Further, bolts 130 are secured by pins such as that shown at 134 which are positioned through a pin hole such as that shown at 136 formed in downward ends of each bolt 130.

Finally, holes 138 are formed in opposing ends of top plate 120 for receiving a bolt (undepicted) which couples puller body 118 to a bracket 140 (refer to FIG. 1). As schematically shown in FIG. 1, clamp 140 is coupled to rod 24 which is movable horizontally via fluid-actuated cylinder 22.

Figure 4:
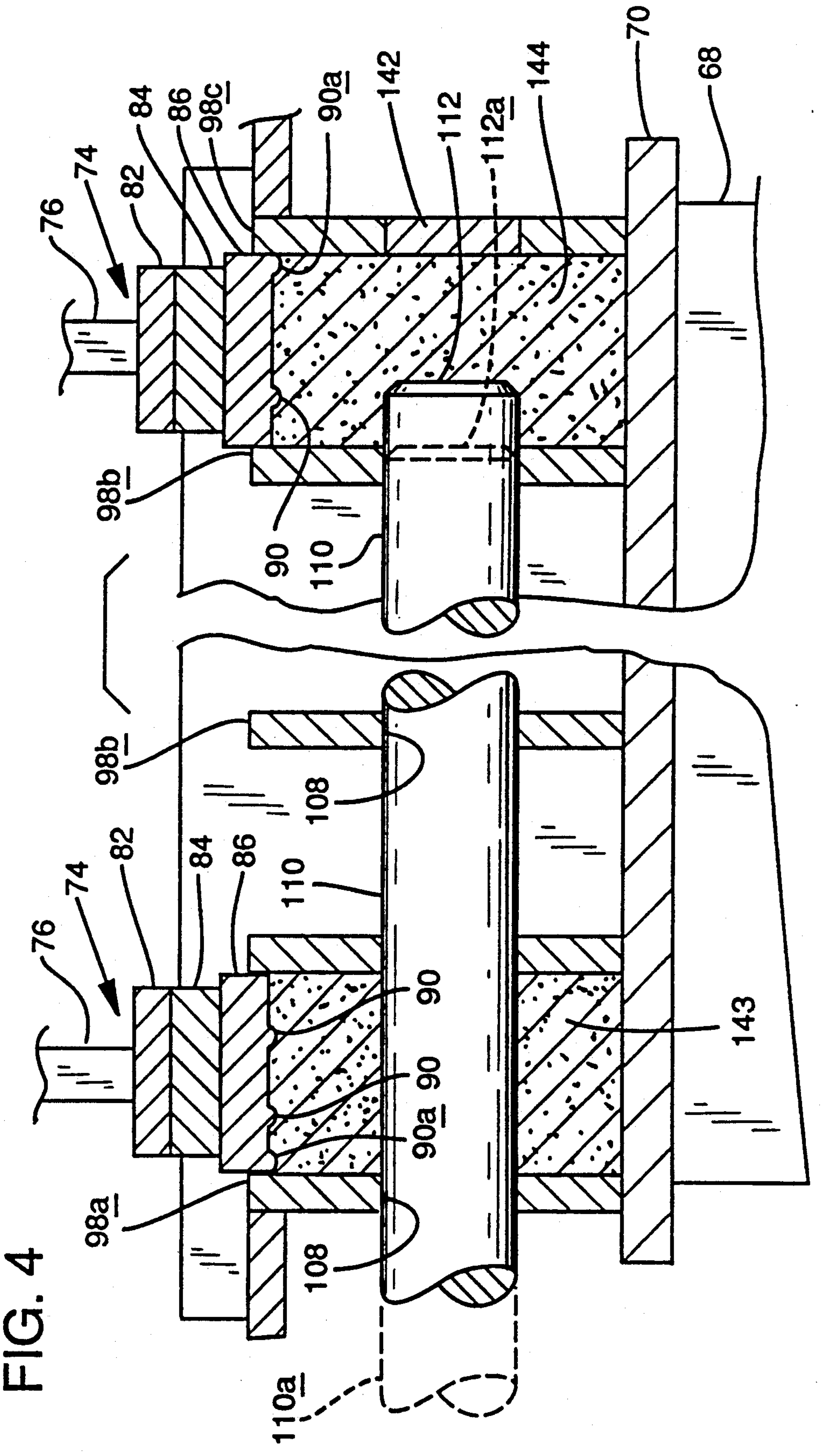
FIG. 4 is a fragmentary sectional view of the apparatus of the present invention, illustrating the pressing step of the method of the present invention.

Referring to FIGS. 3*a* and 3*b*, plugs 142 are removably positioned in core-bar holes 108 of back cross member 98*c*. Referring to FIG. 4, back mold cavity 94*a* is shown in further detail with inserting end 112 of core-bar 110 being inserted through one of core-bar holes 108 and protruding into the back mold cavity a first distance of about one and one-half inches.

Still referring to FIG. 4, inserting end 112 could also be inserted so that it does not extend into the back mold cavity as shown by dotted lines 110*a* with inserting end 112*a* filling the corresponding core-bar hole.

By positioning plugs 142 and inserting ends 112 of core bars 110 in cross members adjacent back mold cavities 94*a* as above described, the back mold cavities are converted into capping-brick-mold cavities.

OPERATION

The method of operation of the apparatus of the present invention provides for making cored bricks and capping bricks in the same mold box. First, referring to FIGS. 3*b* and 4, plugs 142 are removably positioned in the core-bar holes of back cross member 98*c*. This begins the conversion of back mold cavities 94*a* from cored brick cavities to capping brick cavities. The conversion is completed by a method soon to be described.

Next, referring to FIG. 1, the brick making process is begun by moving feeder 13 into the position over mold box 15, shown by dotted lines at 144. Before feeder 13 is opened to empty load 13*a* into mold box 15, core puller section 16 is moved to a first position with core bars 110 extending into the mold box as shown generally in FIG. 1, and more particularly in FIGS. 3*a* and 4.

Referring to FIGS. 3*a* and 4, for purposes of understanding the present invention, it is helpful to describe the mold cavities and associated cross members 98*a*, 98*b*, 98*c* in terms of their relationship to the front of mold box 15 (formed by cross member 98*a*) and the back of mold box 15 (formed by cross member 98*c*). The first mold cavities that core bars 110 are moved through may be thought of as "front" mold cavities and the mold cavities between the "front" mold cavities and back mold cavities 94*a* may be thought of as "middle" mold cavities.

Additionally, viewing each mold cavity individually, it is apparent that pairs of cross members form the front and back of each cavity. For a given cavity, the first, or front, cross member that core bars 110 are moved through may be thought as the "first cross member". Similarly, for the same cavity, the second, or back, cross member that the core bars are moved through may be thought of as a "second cross member".

Still referring to FIGS. 3*a* and 4, preferably core bars 110 are moved into back mold cavities 94*a* so that inserting ends 112 extend approximately 1½ inches therein. However, to achieve the objects of the present invention, inserting ends 112 may extend less than 1½ inches. At a minimum, the inserting ends should extend to that point shown at 112*a* of FIG. 4, i.e. the inserting ends must at least fill the core-bar holes adjacent back mold cavities 94*a*.

Then, referring to FIGS. 1 and 2, stripper beam 42 is raised by fluid-actuated cylinders 52, 54 and associated rods 56, 58 so that pallet table 68 and pallet 70 are raised to the position shown by dotted lines at 146. In this position, pallet 70 forms a bottom surface of mold box 15 (see FIGS. 3*a*, 3*b*) Next, feeder 13 is opened, causing load 13*a* to fill cavities 94, 94*a* of mold box 15.

Once emptied, feeder 13 is moved out of brick forming section 14 as shown by solid lines in FIG. 1. At this point, with reference to FIGS. 2 and 4, compression beam 40 is moved downwardly causing mold shoe units 76 to press into cavities 94, compacting the concrete therein, and forming plural uncured cored bricks such as cored brick 143, and plural uncured capping bricks, such as capping brick 144.

Referring to FIGS. 4–10, elongate, interconnecting, snake-like protrusions 90 and edge-protrusions 90*a* press elongate, interconnecting indentations 145 and elongate edge-indentations 145*a*, respectively, into first surfaces 146, 147 of the cored bricks and capping bricks. As shown in FIGS. 7 and 8, indentations 145 may extend to the edges of first surfaces 146, 147 to produce an effect to be discussed in connection with FIG. 11.

Once the bricks are compacted and indentations 145, 145*a* are formed in first surfaces 146, 147, the bricks are removed from mold box 15 by using mold shoe units 76 as means for ejecting the bricks. To prepare for ejecting the bricks, core puller section 16 is moved to its second position, shown in FIG. 3*b*, with inserting ends 112 of core bars 110 removed from cavities 94, 94*a* and resting in core-bar holes 108 of mold member 98*a*.

Having the core bars positioned in this way is important for two reasons. First, the bricks cannot be ejected without removing the core bars. Second, by having the core bars rest in the core-bar holes of mold member 98*a*, the core bars can be easily moved to the core puller section's first position without having to guide each core bar into desired core-bar holes.

Continuing with the description of how bricks are ejected from the mold box, and referring to FIGS. 1 and 2, compression beam 40 is extended downwardly while stripper beam 42 is also extended downwardly. Specifically, stripper beam 42 is extended downwardly so that pallet table 68 and pallet 70 are positioned in line with transferring section 18 and antiquing section 26 as shown in FIG. 1. As pallet 70 is lowered, mold shoe units 76 force uncured bricks 143, 144 onto the pallet as shown in FIG. 6. Bricks 143, 144 have the following approximate dimensions: 8″ long × 3⅝″ wide × 2″ high.

Referring to FIGS. 4, and 6, plural, uncured, uncoated, cored bricks 143 are formed, each having three cores 148 formed therein due to the positioning of core bars 110 through cavities 94 before the cavities were filled with concrete and compacted by mold shoe units 76. By way of example, two cores 148 are shown in FIG. 6.

Referring to FIGS. 4, and 6, plural, uncured, uncoated, capping bricks 144 are formed, each having three recesses 150 formed in a bottom surface 151 thereof. The recesses are formed due to the positioning of core bars 110 into cavities 94*a* before the cavities were filled with concrete and compacted by mold shoe units 76. Again by way of example, two recesses 150 are shown in FIG. 6.

Still referring to FIGS. 4 and 6, it is important to note for reasons soon to be described, that capping bricks 144 are formed in the back row of mold cavities, i.e. cavities 94*a*. The effect of their being so formed is that, after ejection from the mold box, capping bricks 144 will be positioned on pallet 70 with their top surfaces 154 exposed. Top surfaces 154 must be exposed to allow for a soon to be described step of applying coatings to the bricks.

Next, referring to FIG. 1, the applying step of the method of the present invention will be described. After ejecting the bricks, pallet 70 is lowered via stripper beam 42 so that it is in line with transferring section 18. Section 18 is actuated by a suitable control mechanism to push the pallet of uncured cored bricks and capping bricks out of section 14 and into antiquing section 26.

It is noted that, according to FIG. 1, a new pallet has to be placed on pallet table 68 once section 18 transferred a pallet of bricks to section 26. This could be done manually. However, referring to the right side of FIG. 1, it could also be done using a series of pallets placed end-to-end on frame 20, forming a "train" of pallets. Section 18 would necessarily be moved to the end of the "train" and used to push the "train". The result of such an arrangement would be to use empty, to-be-used pallets to push a pallet carrying bricks from section 14 to section 26. Further, by using such a "train" of pallets, the empty pallet adjacent the brick-carrying pallet would be automatically pushed into position on pallet table 68.

As shown in FIG. 1, two different-colored polymeric coatings are applied to the bricks' side surfaces as shown at 25. The second, or top, coating is applied while the first, or base, coat is wet. Such "wet-layering" of coatings has been found to produce a surprisingly effective antiqued appearance in the brick after curing. It is also important to apply the coatings before curing to allow the coating to cure into the brick surface during the curing process, thus to weatherproof the antiqued brick.

Referring to FIGS. 7 and 8, a coated cored brick and a coated capping brick are shown as examples of the antiqued bricks obtainable using the apparatus and method of the present invention. The composite coating of "wet-layered" polymeric coatings 30*a*, 30*b* is shown by randomly placed dashes 152 on first surfaces 146, 147, of bricks 143, 144, respectively. By configuring first surfaces 146, 147 with the combination of elongate indentations 145 and the composite coating, a surprisingly effective method is provided for making antiqued concrete bricks.

Preferably, a neutral, or medium, colored coating is used as a base coat and a dark or light colored coating is used as a top coat. For example, if plural brown colored coatings are to be applied to first surfaces 146, 147, then a medium brown colored coating is used as the base coat. Next, non-neutral coatings, i.e. coatings having dark or light brown colors relative to the base coat, are used as top coatings.

For antiquing purposes, it is also effective to apply and "wet-layer" more than two coatings (undepicted), and as many as ten coatings have been successfully applied to the brick. Again, a neutral colored coating may be applied as the base coat, and non-neutral coatings are applied as top coatings. To achieve a two-toned antiqued appearance in exposed surfaces of the bricks, a top coating may be applied to only a portion of first surfaces 146, 147, or to only a portion of top surfaces 154.

Also, still referring to FIGS. 7 and 8, edge indentations 145*a* are formed in bricks 143,144, and give the concrete bricks a novel "rolled edge" appearance that is popular in the brick industry but heretofore unknown to concrete bricks.

Referring to FIGS. 1, 3*a* and 6, it is now clear why the capping bricks must be formed in back mold cavities 94*a*. By forming capping bricks in the back mold cavities, top surfaces 154 are easily accessible for applying coatings 30*a*, 30*b*. In this regard, refer to FIG. 1, to see that coatings 30*a*, 30*b* are applied to first surfaces of the bricks and to top surfaces of capping bricks (see double arrow to the right of paint rollers 28 in FIG. 1).

Finally, refer to FIG. 11 to see an illustration of how the antiqued cored and capping bricks made according to the present invention are used. Cored bricks 143 are stacked on mortar beds 155 with their antiqued first surfaces 146 exposed for viewing. Likewise, capping bricks 144 are positioned with their first surfaces 147 exposed for viewing. Additionally, antiqued top surfaces 154 are exposed for viewing because the capping bricks define the outer boundary of a window sill 156.

Referring to FIGS. 7 and 8, it is also important to note that bricks 143, 144 include indentations 145 that extend to the edges of first surfaces 146, 147. This structural feature of the bricks is shown to display how the pattern of indentations on one brick can be made to appear to "run on" to adjacent bricks. By using the bricks shown in FIGS. 7 and 8 to form a wall like that in FIG. 11, the bricks' patterns will appear to "run on" from one brick to another. Such a feature has been found to produce a surprisingly effective antiqued appearance in the brick walls formed by bricks made according to the present invention.

While the present invention has been shown and described with reference to the foregoing preferred embodiment, it will be apparent to those skilled in the art that other changes in form and detail may be made therein without departing from the spirit and scope of the invention as defined in the appended claims.

It is claimed and desired to secure by Letters Patent:

1. A method for making concrete cored bricks and capping bricks comprising:

providing a mold having a row of mold cavities separated by cross members, each cross member having at least one core-bar hole formed therein, and each mold cavity being defined by a front cross member and a rear cross member, the row of mold cavities ending with a back cavity in which a capping brick is formed;

inserting a core bar through each core-bar hole in each cross member of each mold cavity preceding the back cavity, and into and filling the core-bar hole in the front cross-member associated with the back cavity, wherein the core bar does not extend through the back mold cavity and into the core-bar hole in the rear cross member of the back cavity;

plugging the core-bar in the rear cross member associated with the back cavity with a plugging means thereby providing for the formation of a capping brick therein;

filling the mold cavities with concrete to form plural uncured bricks, including at least one cored brick and at least one capping brick;

compacting the bricks;

removing the core bar from the mold cavities; and ejecting the bricks from the mold.

2. The method of claim 1 wherein the inserting step includes inserting the core- bar through the core-bar hole in the front cross member associated with the back cavity so that the core bar extends a first distance into the back cavity that is less than a distance across the back cavity to the rear cross member.

3. The method of claim 2 wherein the inserting step includes inserting the core bar a first distance of about one half of an inch.

4. The method of claim 3 wherein the inserting step includes inserting a plurality of core bars into a mold having a plurality of rows of mold cavities.

* * * * *